Patented Feb. 10, 1942

2,272,783

UNITED STATES PATENT OFFICE 2,272,783

AGENTS FOR IMPROVING THE FASTNESS OF DIRECTLY DYED CELLULOSE FIBERS TO WATER, ACID BOIL, AND WET IRONING, AND THEIR MANUFACTURE

Jules Treboux, Neue Welt, near Basel, Switzerland, assignor to the firm of J. R. Geigy A. G., Basel, Switzerland No Drawing. Application September 25, 1939, Serial No. 296,516. In Switzerland September 22, 1938

10 Claims. (Cl. 260—584)

It is known that by after-treatment of directly dyed cellulose fibers with a polyethylenepolyamine salt or a hydroxyl substitution product thereof, the fastness to water, acid boil and wet ironing of the dyeings is improved.

This invention consists in a similar treatment with a water- or acid-soluble body obtained by condensing an aliphatic di- or polyamine or a hydroxyl substitution product thereof with an aldehyde and a compound which contains at least one reactive hydrogen atom. Such compounds are for instance the amino-hydroxy- or sulphhydryl-compounds or suitable derivatives of carboxylic or sulphonic acids as amides, urethanes, ureas, guanidines or the like, and these compounds may belong to the aliphatic, alicyclic, homocyclic or heterocyclic series. A condensation product of such kind is used for after-treating direct dyeings and is found to improve considerably the fastness to water to a greater extent than is achieved by the amine itself. The base produced by the condensation is used in practice in the form of a salt with an inorganic or organic acid, for instance hydrochloric-, sulphuric-, phosphoric-, acetic- or lactic acid or in the form of the mixture of the base with the suitable acid.

The following examples illustrate the invention, the parts being by weight:

*Example 1*

73 parts of triethylenetetramine, 110 parts of formaldehyde of 28 per cent strength and 300 parts of acetone are mixed together and the mixture is boiled under reflux for 12 hours and then the acetone and water are distilled. 0.02 part of the residue dissolved in 125 parts of water and an equivalent quantity of acetic acid, renders completely fast to water 5 parts of cotton dyed with diphenyl Fast Violet C4B (Schultz, Farbstofftabellen 1932, vol. II, page 84).

The same result may be obtained when instead of triethylenetetramine there is used the mixture boiling under 14 mm. between 100° and 200° C. of polyethylenepolyamines obtainable from dichlorethane and ammonia (see Hofmann, Ber., vol. 23, page 3711). In the same manner one may cause the hydroxypolyamines obtainable from polyhalogenchlorhydrins, for example glycerine-dichlorhydrin and ammonia to react with formaldehyde and acetone.

*Example 2*

52 parts of diethylenetriamine, 110 parts of formaldehyde of 28 per cent strength and 300 parts of acetone are together boiled under reflux for 10 hours and the whole is then evaporated. The salts of the condensation product thus obtained effect the same improvement in the water fastness of direct dyeings as is described in Example 1.

*Example 3*

73 parts of triethylenetetramine, 110 parts of formaldehyde of 28 per cent strength and 300 parts of ethylmethylketone are mixed together and the mixture is boiled for 20 hours and then evaporated. The bright viscid residue applied in the usual manner to directly dyed cellulose fibers produces a very good improvement in the fastness to water.

*Example 4*

52 parts of diethylenetriamine, 300 parts of acetone and 44 parts of acetaldehyde are mixed together and the mixture is boiled for 20 hours and then evaporated. In the form of a salt the final product has an action similar to that of the product in Example 1.

*Example 5*

52 parts of diethylenetriamine, 300 parts of isobutylmethylketone and 110 parts of formaldehyde of 28 per cent strength are together heated for 20 hours to 80–90° C. and then evaporated. The residue is soluble in dilute formic acid or acetic acid and produces an improvement in the water fastness of direct dyeings similar to that produced by the product of Example 1.

*Example 6*

60 parts of acetamide, 73 parts of triethylenetetramine, 110 parts of formaldehyde of 28 per cent strength and 250 parts of alcohol are heated for 12 hours to 70° C. The resulting solution, after having been adjusted to the required concentration, can immediately be used for the improvement of the fastness to water of directly dyed cellulose. However, the reaction product can also be isolated by evaporation.

*Example 7*

12 parts of diacetonamine, 50 parts of water, 8 parts of triethylenetetramine and 15 parts of formaldehyde of 28 per cent strength are heated for 24 hours on the water-bath. The diluted solution of the reaction product renders direct dyeings fast to water.

An analogous product is obtained if instead of triethylenetetramine 6 parts of diethylenetriamine are used.

*Example 8*

24 parts of 4-dimethylamino-2'-hydroxy-5'-methyl-diphenylmethane, 10 parts of triethylenetetramine, 10 parts of formaldehyde of 30 per cent strength and 20 parts of water are treated for 20 hours to 90-100° C. The reaction product improves the fastness of direct dyeings to water, acid boil and wet ironing.

The triethylenetetramine can be replaced by equimolecular quantities of diethylenetriamine or ethylenediamine. Instead of the said aminohydroxy-diphenylmethane compound, its isomers or homologues can be used.

*Example 9*

90 parts of urethane, 73 parts of triethylenetetramine, 110 parts of formaldehyde of 28 per cent strength and 250 parts of alcohol are heated for 12 hours to 70° C. The reaction product renders direct dyeings fast to water.

*Example 10*

20 parts of formaldehyde of 30 per cent strength, 10 parts of ammonia of 25 per cent strength and 20 parts of water are mixed, while stirring, with a solution of 10 parts of phenol in 2 parts of water, then stirred for one hour and the solution is filtered. Thereupon, 18 parts of formaldehyde of 30 per cent strength are added, the whole is heated for one hour to 90° C., the reaction solution is filtered and stirred with 15 parts of diethylenetriamine and 100 parts of water for 5 hours at 60-70° C. The reaction product, which is soluble in diluted acetic acid, renders direct dyeings fast to water.

*Example 11*

9 parts of piperidine, 15 parts of formaldehyde of 30 per cent strength, 15 parts of triethylenetetramine and 50 parts of alcohol are boiled for 24 hours on the reflux apparatus, neutralised with acetic acid and the resulting solution, after having been adjusted to the usual dilution, is able of being used for rendering direct dyeings fast to water.

*Example 12*

18 parts of glycerine, 15 parts of triethylenetetramine, 30 parts of formaldehyde of 30 per cent strength and 200 parts of water are boiled for 24 hours on the reflux apparatus. The reaction product is a good agent for improving the fastness to water of direct dyeings.

What I claim is:

1. Process for the manufacture of water- or acid soluble agents for improving the fastness of directly dyed cellulose fibers to water, acid boil and wet ironings, comprising condensing an aldehyde selected from the group consisting of formaldehyde and acetaldehyde with a polyethylene polyamine and a saturated open-chain aliphatic ketone.

2. Process for the manufacture of water- or acid soluble agents for improving the fastness of directly dyed cellulose fibers to water, acid boil and wet ironing, comprising condensing formaldehyde with a polyethylene polyamine and a saturated open-chain aliphatic ketone.

3. Process for the manufacture of water- or acid soluble agents for improving the fastness of directly dyed cellulose fibers to water, acid boil and wet ironing, comprising condensing formaldehyde with triethylenetetramine and acetone.

4. Process for the manufacture of water- or acid soluble agents for improving the fastness of directly dyed cellulose fibers to water, acid boil and wet ironing, comprising condensing a polyethylene polyamine mixture, boiling under 14 mm. between 100 and 200° C., formaldehyde and acetone.

5. Process for the manufacture of water- or acid soluble agents for improving the fastness of directly dyed cellulose fibers to water, acid boil and wet ironing, comprising condensing diethylenetriamine, formaldehyde and acetone.

6. The condensation products which are the product of interaction of an aldehyde selected from the group consisting of formaldehyde and acetaldehyde, a polyethylene polyamine and a saturated open-chain ketone, being water- to acid-soluble compounds, well suited for the after treatment of directly dyed cellulose fibers.

7. The condensation products made according to the process of claim 2, being water- to acid soluble compounds, well suited for the aftertreatment of directly dyed cellulose fibers.

8. The condensation product made according to the process of claim 3, being a water- to acid soluble compound, well suited for the aftertreatment of directly dyed cellulose fibers.

9. The condensation product made according to the process of claim 4, being a water- to acid soluble compound, well suited for the aftertreatment of directly dyed cellulose fibers.

10. The condensation product made according to the process of claim 5, being a water- to acid soluble compound, well suited for the aftertreatment of directly dyed cellulose fibers.

JULES TREBOUX.